United States Patent
Kakinuma et al.

(10) Patent No.: US 7,527,431 B2
(45) Date of Patent: May 5, 2009

(54) BEARING UNIT AND ROTATING APPARATUS USING THE BEARING UNIT

(75) Inventors: Yoshiaki Kakinuma, Tokyo (JP); Takeshi Kaneko, Chiba (JP); Hiroshi Sato, Chiba (JP); Kenichiro Yazawa, Tokyo (JP)

(73) Assignee: Sony Corporation (JP)

( * ) Notice: Subject to any disclaimer, the term of this patent is extended or adjusted under 35 U.S.C. 154(b) by 354 days.

(21) Appl. No.: 11/484,682

(22) Filed: Jul. 12, 2006

(65) Prior Publication Data

US 2007/0025653 A1 Feb. 1, 2007

(30) Foreign Application Priority Data

Jul. 27, 2005 (JP) ............................. 2005-217763

(51) Int. Cl.
*F16C 32/06* (2006.01)
*F16C 33/10* (2006.01)

(52) U.S. Cl. ..................... 384/100; 384/107; 384/279

(58) Field of Classification Search ............... 384/100, 384/107, 111–114, 118–120, 130, 132, 279, 384/902–903; 310/89–90; 360/99.08, 98.7
See application file for complete search history.

(56) References Cited

U.S. PATENT DOCUMENTS

| | | | | |
|---|---|---|---|---|
| 6,513,979 | B2 * | 2/2003 | Mori et al. ................... | 384/107 |
| 6,692,152 | B2 * | 2/2004 | Shingai et al. ............... | 384/132 |
| 6,832,853 | B2 * | 12/2004 | Fujinaka ...................... | 384/279 |
| 6,880,976 | B2 * | 4/2005 | Huang et al. ................. | 384/100 |
| 7,258,487 | B2 * | 8/2007 | Yazawa et al. ................ | 310/90 |
| 2004/0008910 | A1 * | 1/2004 | Oelsch ......................... | 384/100 |
| 2004/0013329 | A1 * | 1/2004 | Yamashita et al. ........... | 384/100 |

FOREIGN PATENT DOCUMENTS

| | | |
|---|---|---|
| JP | 2002-122141 | 4/2002 |
| JP | 2003047192 A * | 2/2003 |
| JP | 2003-314536 | 11/2003 |
| JP | 2005-069382 | 3/2005 |
| JP | 2005-69382 A | 3/2005 |
| JP | 2005214239 A * | 8/2005 |
| WO | WO 03036111 A1 * | 5/2003 |
| WO | WO 2004063582 A1 * | 7/2004 |

OTHER PUBLICATIONS

Japanese Office Action issued Jan. 21, 2009 for corresponding Japanese Application No. 2005-217763.

* cited by examiner

*Primary Examiner*—Marcus Charles
(74) *Attorney, Agent, or Firm*—Rader Fishman & Grauer PLLC; Ronald P. Kananen (57) ABSTRACT

A bearing unit and a rotating apparatus which prevent leakage of lubricating oil to the utmost and which are superior in reliability are disclosed. A radial bearing and a thrust bearing support a shaft for rotation, and a path forming member and a path forming member lid form a communicating path having a function of short-circuiting pressure generated when the shaft and the radial bearing rotate relative to each other. A housing has a function of covering and holding the members mentioned while the housing is open at one end of the shaft with a small void left therebetween. Lubricating oil is filled in the void. The path forming member and the path forming member lid fully cover the members mentioned, except a shaft opening side portion of the radial bearing. The housing is made of a molded resin material.

12 Claims, 7 Drawing Sheets

BEARING UNIT AND ROTATING APPARATUS USING THE BEARING UNIT

CROSS REFERENCES TO RELATED APPLICATIONS

The present invention contains subject matter related to Japanese Patent Application JP 2005-217763 filed in the Japanese Patent Office on Jul. 27, 2005, the entire contents of which being incorporated herein by reference.

BACKGROUND OF THE INVENTION

1. Field of the Invention

The present invention relates to a bearing unit which incorporates a countermeasure for preventing leakage of lubricating oil and a rotating apparatus which incorporates a bearing unit of the type described.

2. Description of the Related Art

First, a bearing unit of a related art is described with reference to FIGS. 6 to 9.

Figure 6:
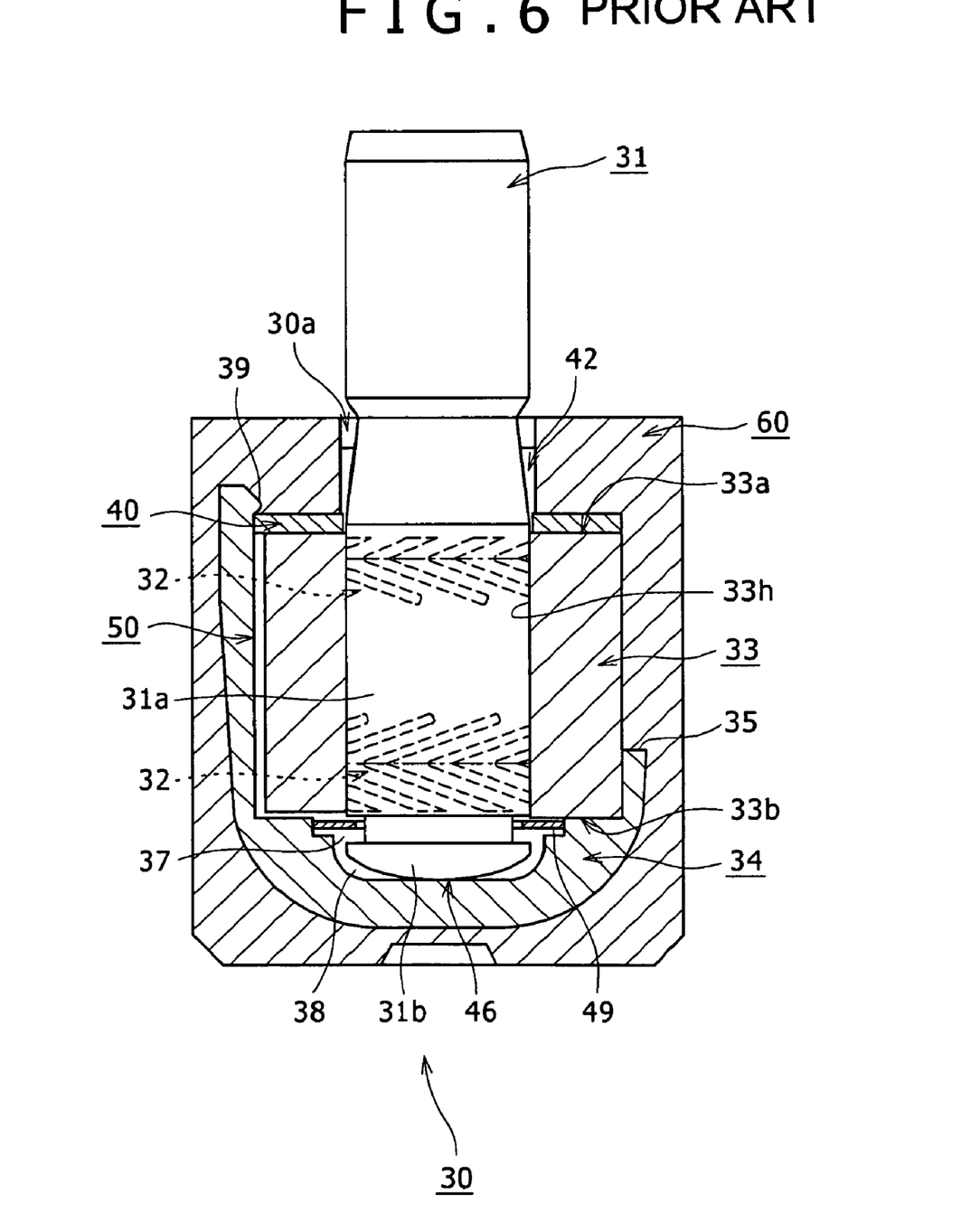
FIG. 6 is a vertical sectional side elevational view of a bearing unit of a related art.
Figure 7A:
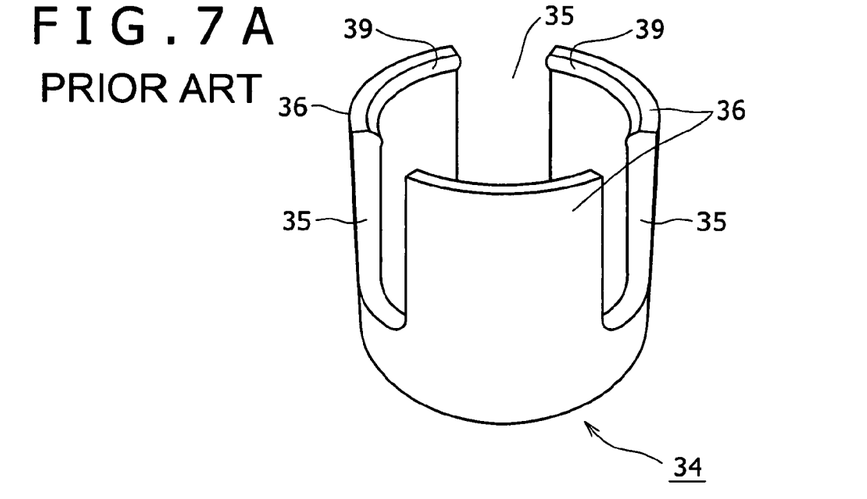
FIG. 7A is a perspective view of the entire path forming member.
Figure 7B:
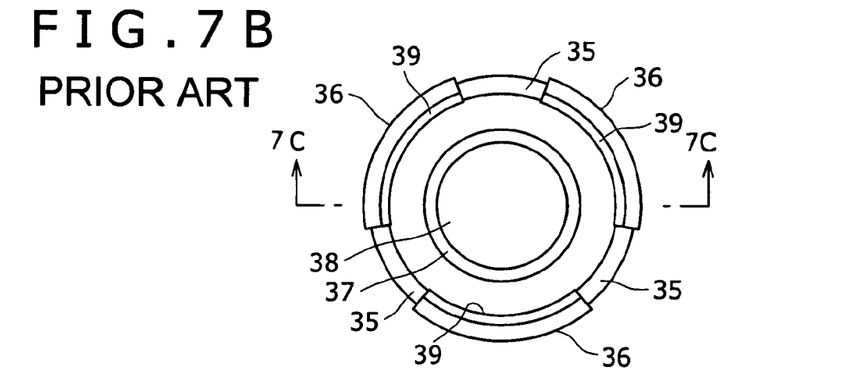
FIG. 7B is a top plan view of the path forming member and FIG. 7C is a vertical sectional side elevational view taken along line 7C-7C of FIG. 7B.
Figure 7C:
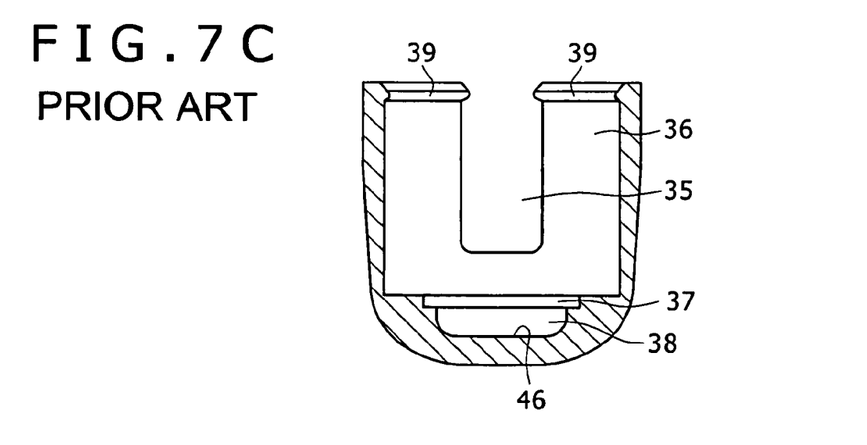
Figure 8:
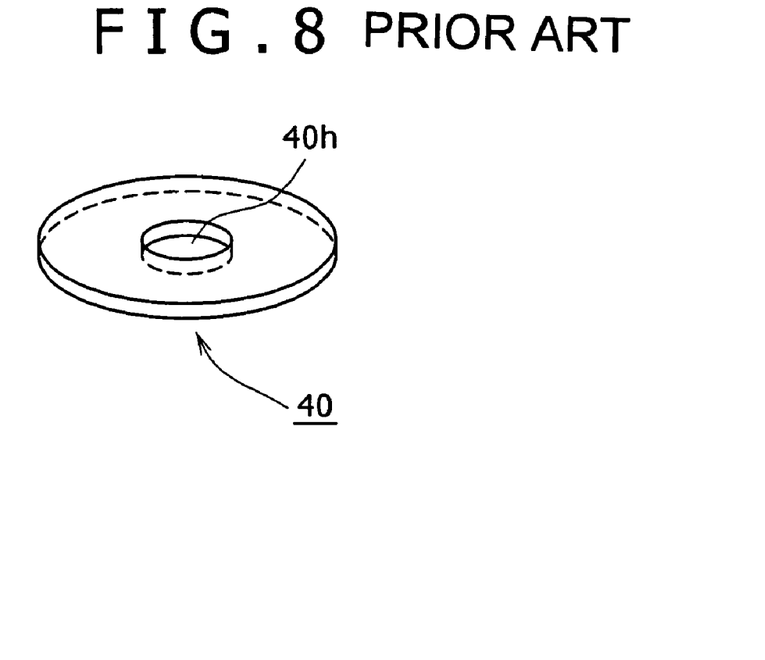
FIG. 8 is a perspective view of a path forming member lid, which is another component of the bearing unit shown in FIG. 6, and which cooperates with the path forming member shown in FIG. 6.
Figure 9:
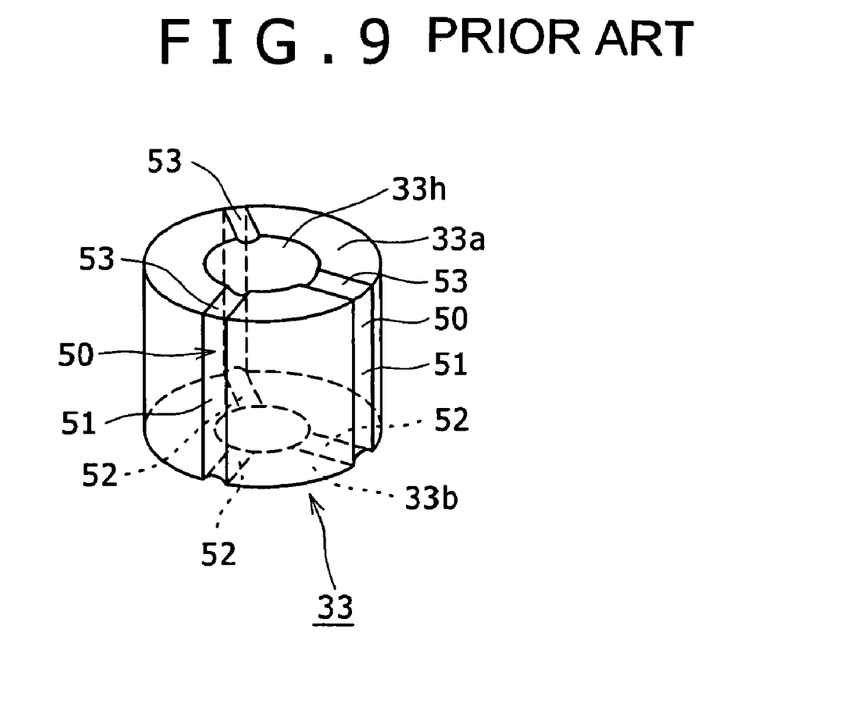
FIG. 9 is a perspective view of a radial bearing which is a further component of the bearing unit shown in FIG. 6.

In particular, FIG. 6 is a side elevational sectional view showing the bearing unit of the related art mentioned. FIGS. 7A to 7C show a path forming member which is a component of the bearing unit shown in FIG. 6, and wherein FIG. 7A is a perspective view of the entire path forming member; FIG. 7B is a top plan view of the path forming member; and FIG. 7C is a sectional view taken along line 7C-7C of FIG. 7B. Further, FIG. 8 is a perspective view of a path forming member lid which is a component of the bearing unit shown in FIG. 6 and cooperates with the path forming member shown in FIG. 6. FIG. 9 is a perspective view of a radial bearing which is another component of the bearing unit shown in FIG. 6.

Referring first to FIG. 6, the bearing unit of the related art is denoted by a numeral 30. The bearing unit 30 is the same as a bearing unit disclosed in Japanese Patent Laid-Open No. 2005-69382 (pages 9 to 18, FIG. 3). The bearing unit 30 includes a radial bearing 33, a path forming member 34, a path forming member lid 40, and a housing 60. The radial bearing 33 supports a shaft 31 in a circumferential direction at a portion 31a thereof which is supported for rotation by dynamic pressure and has dynamic pressure generating grooves 32 formed on an outer periphery thereof. The radial bearing 33 has a shaft opening side end face 33a and a thrust bearing side end face 33b formed thereon. The path forming member 34 covers a circumferential face of part of the radial bearing 33 and has a thrust bearing 46 formed at a bottom portion thereof. The path forming member lid 40 has a shaft fitting hole 40h formed at a central portion thereof, as particularly seen in FIG. 8, and has a diameter sufficient to allow the shaft 31 to pass through the shaft fitting hole 40h. The path forming member lid 40 covers the shaft opening side end face 33a of the radial bearing 33.

Referring to FIG. 9, the radial bearing 33 has a cylindrical structure and a through-hole 33h formed axially at a central portion thereof. The upper end face of the radial bearing 33 is formed as a shaft opening side end face 33a while the lower end face of the radial bearing 33 is formed as a thrust bearing side end face 33b. The radial bearing 33 further has a plurality of grooves, three in the arrangement shown, with first grooves 51 formed on an outer circumferential face thereof. The radial bearing 33 further has an equal number of second grooves 52 and an equal number of third grooves 53 formed on the thrust bearing side end face 33b and the shaft opening side end face 33a thereof, respectively, and both communicating with the first grooves 51 to form communicating paths 50.

Referring now to FIGS. 7A to 7C, the path forming member 34 has a cup-shaped configuration and a thrust bearing 46 formed on a bottom face thereof. An upper cylindrical portion of the path forming member 34 has three arcuate plates 36 separated by three cutaway portions 35 for covering the communicating paths 50 to assure voids for the grooves of the communicating paths 50. The path forming member 34 has a space 37 and another space 38 formed at a central portion of the bottom portion thereof. The space 37 can be expanded outwardly to accommodate a flexible coming off preventing washer 49 when the shaft 31 is pushed into the same, while the space 38 can accommodate a lower end portion 31b of the shaft 31 therein. The spaces 37 and 38 form a thrust space which is communicated also with the communicating paths 50 such that lubricating oil 42 can be circulated. Further, engaging pawls 39 are formed to extend inwardly from a circumferential edge of the path forming member 34 at the upper opening.

Referring now to FIG. 8, the path forming member lid 40 has a donut-shaped flat disk shape and a shaft fitting hole 40h formed at a central portion thereof. The path forming member lid 40 has a size a little greater than the diameter of the engaging pawls 39 formed at the opening of the path forming member 34 and is fitted in through the engaging pawls 39 while pushing away the engaging pawls 39. The path forming member lid 40 is locked by the engaging pawls 39 so that it does not move upwardly.

Upon assembly of the bearing unit 30, the coming off preventing washer 49 is disposed in the space 37 of the path forming member 34 in advance, and the radial bearing 33 is fitted into the coming off preventing washer 49 with the thrust bearing side end face 33b directed downwardly. Then, the path forming member lid 40 is fitted in from above the path forming member 34 and secured by the engaging pawls 39 such that it closely contacts with the shaft opening side end face 33a of the radial bearing 33.

Where the bearing unit 30 is assembled in this manner, the three third grooves 53 of the radial bearing 33 are closed up with the path forming member lid 40 to form pipe-shaped space paths, and the three first grooves 51 of the radial bearing 33 are closed up with the arcuate plates 36 of the path forming member 34 to form pipe-shaped space paths. Further, the three second grooves 52 of the radial bearing 33 are open to the space 37 to form space paths. The space paths formed in this manner form communicating paths 50 through which lubricating oil 42 can be supplied and circulated to the dynamic pressure generating grooves 32 of the shaft 31, and which have a function of short-circuiting pressure, which is generated when the shaft 31 and the radial bearing 33 rotate relative to each other.

If an outer surface of the path forming member 34 and an upper face of the path forming member lid 40 are sealed with a resin material using a metal mold while the bearing unit 30 is in the assembled state described above, then the bearing unit 30 can be covered with the housing 60 of the resin material. In particular, the housing 60 made of a resin material can cover the bearing unit 30 over part of the outer circumferential face of the radial bearing 33 which is exposed by the cutaway portions 35 of the path forming member 34 and the outer surface of the arcuate plates 36 and over the upper surface of the path forming member lid 40.

Thereafter, if the shaft 31 is inserted and pushed through the shaft fitting hole 40h of the path forming member lid 40 and the through-hole 33h of the radial bearing 33 into a central portion of the coming off preventing washer 49, then the bearing unit 30 having the structure shown in FIG. 6 is obtained. After the bearing unit 30 is completed, the lubricating oil 42 is poured in from the shaft opening end 30a side of the bearing unit 30 so as to fill between the shaft fitting hole 40h of the radial bearing 33 and the shaft 31 and the communicating paths 50.

The bearing unit 30 is assembled in such a manner as described above.

SUMMARY OF THE INVENTION

The bearing unit 30 having such a configuration as described above can be suitably used as a bearing for a motor of a heat radiating apparatus incorporated in an electronic apparatus such as a computer, particularly a portable computer. Therefore, leakage of the lubricating oil 42 should be prevented to the utmost.

As described above, in the bearing unit 30 of the related art, the arcuate plates 36 of the path forming member 34 cover the communicating paths 50. However, part of the radial bearing 33 contacts directly with the housing 60 due to the presence of the cutaway portions 35 of the path forming member 34.

When the shaft 31 rotates relative to the radial bearing 33, the lubricating oil 42 filled in the internal voids of the bearing unit 30 circulates in the voids in the bearing unit 30 as described above. However, there is the possibility that part of the lubricating oil 42 may come round to the surface of the path forming member 34 from the location where the radial bearing 33 contacts directly with the housing 60.

The housing 60 is formed by outsert molding or the like of a resin material, and the path forming member 34 has a pawl structure formed from the three arcuate plates 36 by the cutaway portions 35. Therefore, the housing 60 is structured such that the molding resin material which forms the housing 60 has a comparatively small thickness at the portions of the path forming member 34 at which the arcuate plates 36 exist but has a comparatively great thickness at the other portions of the path forming member 34 at which the arcuate plates 36 do not exist.

Therefore, upon molding of the housing 60, molten resin material flows, but not uniformly, and does not run uniformly. Therefore, a weld (joint of the resin material upon molding) is likely to appear. Further, since the path forming member 34 has a pawl structure, it is compressed diametrically upon molding of the housing 60. However, where the bearing unit 30 is placed under a high temperature environment, the arcuate plates 36 of the path forming member 34 are inclined to open outwardly by internal residual stress, and there is the possibility that a crack may appear at a portion of the housing 60 at which a difference in thickness exists.

If such a weld or a crack occurs with the housing 60, then the surface of the path forming member 34 is communicated with the outside and the lubricating oil 42 leaks to the outside from the inside of the radial bearing 33 through the weld or crack. Thus, the bearing unit 30 of the related art has a subject to be in that good lubrication is difficult to achieve readily, resulting in deterioration of the reliability.

Therefore, it is desirable to provide a bearing unit and a rotating apparatus using the bearing unit which prevent leakage of lubricating oil to the utmost and which are superior in reliability.

According to an embodiment of the present invention, there is provided a bearing unit including a radial bearing and a thrust bearing configured to support a shaft for rotation, a path forming member and a path forming member lid configured to form a communicating path having a function of short-circuiting pressure generated when the shaft and the radial bearing rotate relative to each other, a housing having a function of covering and holding the shaft, radial bearing, thrust bearing, path forming member and path forming member lid while the housing is open at one end of the shaft with a small void left therebetween, and lubricating oil filled in the void, the path forming member and the path forming member lid cooperating with each other to fully cover the shaft, the radial bearing, the thrust bearing, the path forming member and path forming member lid except a shaft opening side portion of the radial bearing, and the housing being made of a molded resin material.

According to another embodiment of the present invention, there is provided a bearing unit including a radial bearing having a through-hole formed at a central portion thereof and configured to support a shaft fitted therein for rotation in a circumferential direction, the radial bearing further having a shaft opening side end face and a thrust bearing side end face, a path forming member having a thrust bearing formed at a bottom portion thereof and covering an overall outer circumferential face of the radial bearing, and a path forming member lid having a shaft fitting hole formed at a central portion thereof and having a diameter sufficient to allow the shaft to be fitted in the shaft fitting hole, the path forming member lid covering the shaft opening side end face of the radial bearing, the bearing unit having an integral structure wherein the radial bearing is fitted coaxially in the path forming member with the overall outer circumferential face thereof covered with the path forming member and is closed up with the path forming member lid with the shaft opening side end face thereof covered with the path forming member lid such that a plurality of lubricating oil circulating paths are formed such that a space between the shaft opening side end face of the radial bearing and an inner face of the path forming member lid, another space between the outer circumferential face of the radial bearing and the inner circumferential face of the path forming member, and a further space in the proximity of the thrust bearing and the through-hole of the radial bearing are communicated with each other while lubricating oil is enclosed in the lubricating oil circulating paths and the overall bottom face and the overall outer circumferential face of the path forming member and the upper face of the path forming member lid, except a portion in the proximity of the shaft fitting hole, are covered with the housing.

Preferably, the radial bearing is made of a sintered metal material. Alternatively, the radial bearing may be formed from a dynamic pressure fluid bearing having a dynamic pressure generating groove formed on an inner circumferential face of the through-hole formed therein.

Preferably, the bearing unit further includes a shaft coming off preventing element provided in a bottom space of the path forming member.

Preferably, the housing is formed as a unitary member from a molded article of a synthetic resin material.

According to a further embodiment of the present invention, there is provided a rotating apparatus including a radial bearing having a through-hole formed at a central portion thereof and configured to support a shaft fitted therein for rotation in a circumferential direction, the radial bearing further having a shaft opening side end face and a thrust bearing side end face, a path forming member having a thrust bearing formed at a bottom portion thereof and covering an overall outer circumferential face of the radial bearing, and a path forming member lid having a shaft fitting hole formed at a central portion thereof and having a diameter sufficient to allow the shaft to be fitted in the shaft fitting hole, the path forming member lid covering the shaft opening side end face of the radial bearing, the bearing unit having an integral structure wherein the radial bearing is fitted coaxially in the path forming member with the overall outer circumferential face thereof covered with the path forming member and is closed up with the path forming member lid with the shaft opening side end face thereof covered with the path forming member lid such that a plurality of lubricating oil circulating paths are formed such that a space between the shaft opening side end face of the radial bearing and an inner face of the path forming member lid, another space between the outer circumferential face of the radial bearing and the inner circumferential face of the path forming member, and a further space in the proximity of the thrust bearing and the through-hole of the radial bearing are communicated with each other while lubricating oil is enclosed in the lubricating oil circulating paths and the overall bottom face and the overall outer circumferential face of the path forming member and the upper face of the path forming member lid, except a portion in the proximity of the shaft fitting hole, are covered with the housing, the shaft being fitted in and supported for rotation by the through-hole of the radial bearing such that the thrust end side portion of the shaft contacts with the thrust bearing of the path forming member.

The rotating apparatus may be a motor including a stator and a rotor, and a rotary shaft of the rotor may be supported for rotation relative to the stator by the bearing unit. Preferably, the bearing unit includes a shaft coming off preventing member provided in a bottom space of the path forming member, and the thrust end portion of the shaft is locked in a center hole of the shaft coming off preventing member.

In the bearing units and the rotating apparatus, the housing can be made of a material, particularly a synthetic resin material, having a uniform thickness over the overall outer periphery of the radial bearing.

With the bearing units and the rotating apparatus, the housing is formed in a housing structure wherein the dynamic pressure generating portion is sealed fully with the path forming member lid, except the shaft fitting hole, and the radial bearing is formed with a substantially uniform thickness over the overall outer periphery thereof. Therefore, the lubricating oil filled in the bearing unit is not likely to suffer from leakage, and consequently, the bearing unit and the rotating apparatus which uses the bearing unit, such as a motor, are superior in reliability.

The above and other objects, features and advantages of the present invention will become apparent from the following description and the appended claims taken in conjunction with the accompanying drawings in which like parts or elements are denoted by like reference symbols.

BRIEF DESCRIPTION OF THE DRAWINGS

FIGS. 3A to 3C show a path forming member suitable for use with the bearing unit of FIG. 2 and wherein

FIGS. 7A to 7C show a path forming member which is a component of the bearing unit shown in FIG. 6 and wherein

DETAILED DESCRIPTION OF THE PREFERRED EMBODIMENTS

In the following, bearing units to which the present invention is applied and a motor which is an example of a rotating apparatus which uses the bearing units are described. According to the present invention, the bearing units and the motor of the embodiments are generally configured such that the bearing unit is formed as a unitary member by fully covering a radial bearing except a shaft opening end portion, while the cutaway portions of the path forming member of the bearing unit of the related art are eliminated.

First, a motor which is an example of a rotating apparatus to which the present invention is applied is described with reference to FIG. 1. The motor mentioned is suitable for use with an electronic apparatus which performs arithmetic operation processing, recording and reproduction and so forth of various kinds of information such as computers, and particularly notebook type computers. Particularly, the motor is suitable for use with a small size electronic apparatus and is formed suitably as a motor for a heat radiating apparatus.

A heat radiating apparatus is provided in the inside of an electronic apparatus, such as a notebook type computer. The heat radiating apparatus includes a base made of a metal material, a motor 1 attached to the base, a fan 3 driven to rotate by the motor 1, a fan case 4 for accommodating the fan 3 therein, and a heat sink (not shown). The motor 1 for driving the fan 3 of the heat radiating apparatus to rotate is described in detail below.

The motor 1 which uses a bearing unit 30A to which the present invention is applied as hereinafter described includes a rotor 11 and a stator 12.

The stator 12 is provided integrally on a top plate 4a of the fan case 4 in which the fan 3 which is driven to rotate by the motor 1 is accommodated together with the motor 1. The stator 12 includes a stator yoke 13, a bearing unit 30A to which the present invention is applied, a coil 14, and a core 15 on which the coil 14 is wound. The stator yoke 13 may be formed integrally with the top plate 4a of the fan case 4, that is, it may be formed from part of the fan case 4 or otherwise may be formed as a separate member from the fan case 4. The stator yoke 13 is formed from, for example, iron. The bearing unit 30A is secured to a holder 16 formed tubularly at a central portion of the stator yoke 13 by force fitting or adhesion or by force fitting and adhesion.

It is to be noted that the holder 16 in which the bearing unit 30A is force fitted is formed tubularly and integrally with the stator yoke 13. The core 15 on which the coil 14 to which driving current is supplied is attached to an outer periphery of the holder 16 formed integrally on the stator yoke 13, as seen in FIG. 1.

The rotor 11 which forms the motor 1 together with the stator 12 is attached to a shaft 31 supported for rotation on the bearing unit 30A such that it rotates together with the shaft 31. The rotor 11 includes a rotor yoke 17 and a fan 3 rotatable integrally with the rotor yoke 17 and having a plurality of blades 19. The blades of the fan 3 are formed integrally with the rotor yoke by outsert molding on an outer circumferential face of the rotor yoke 17.

A ring-shaped rotor magnet 20 is provided on an inner circumferential face of a tubular portion 17a of the rotor yoke 17 in an opposing relationship to the coil of the stator 12. The rotor magnet 20 is a plastic magnet having S poles and N poles magnetized alternately in a circumferential direction, and it is secured to an inner circumferential face of the rotor yoke 17 by a bonding agent.

The rotor yoke 17 is attached for integral rotation to the shaft 31 by force fitting of a hub (boss) portion 21 provided at a central portion of a flat plate portion 17b of the rotor yoke 17 and having a through-hole 21a provided therein in an attaching portion 31c provided at an end portion of the shaft 31 supported by the bearing unit 30A.

In the motor 1 having such a configuration as described above, driving current is supplied to the coil 14 of the stator 12 in accordance with a predetermined energization pattern from a driving circuit (section not shown) provided outside the motor 1. Thereupon, a magnetic field is generated from the coil 14, and the rotor 11 rotates integrally with the shaft 31 by an action between the magnetic field generated from the coil 14 and a magnetic field from the rotor magnet 20 of the rotor 11. As the rotor 11 rotates, the fan 3 attached to the rotor 11 and having the blades 19 thereon also rotates integrally with the rotor 11. As the fan 3 rotates, air outside the apparatus is sucked into a housing of the computer through an opening formed in the housing and is circulated in the housing. Thus, after the air is circulated in a heat sink provided in the housing, it is exhausted to the outside of the housing through a through-hole formed in the housing. Consequently, heat generated from heat generating elements in the computer is radiated to the outside of the computer body by the air to cool the computer body.

Now, the bearing unit 30A according to the first embodiment which is suitable for use with the motor 1 is described with reference to FIGS. 2 to 4.

The bearing unit 30A which supports the shaft 31 of the motor 1 for rotation includes a radial bearing 33 for supporting the shaft 31 in a circumferential direction and a path forming member 34A formed on the outer side of the radial bearing 33. The bearing unit 30A further includes a housing 60A in which the path forming member 34A is accommodated and communicating paths 50 formed between the path forming member 34A and the radial bearing 33.

The bearing unit 30A is configured in such a structure that the path forming member 34A covers the overall periphery of the radial bearing 33. In particular, the radial bearing 33 is covered fully with the path forming member lid 40 and the path forming member 34A, except a portion of the shaft opening end 30a side thereof.

It is to be noted that the radial bearing 33 and the path forming member lid 40 have a structure similar to that of the related art arrangement described hereinabove with reference to FIGS. 9 and 8, respectively, and therefore, an overlapping description of them is omitted herein to avoid redundancy.

Figure 1:
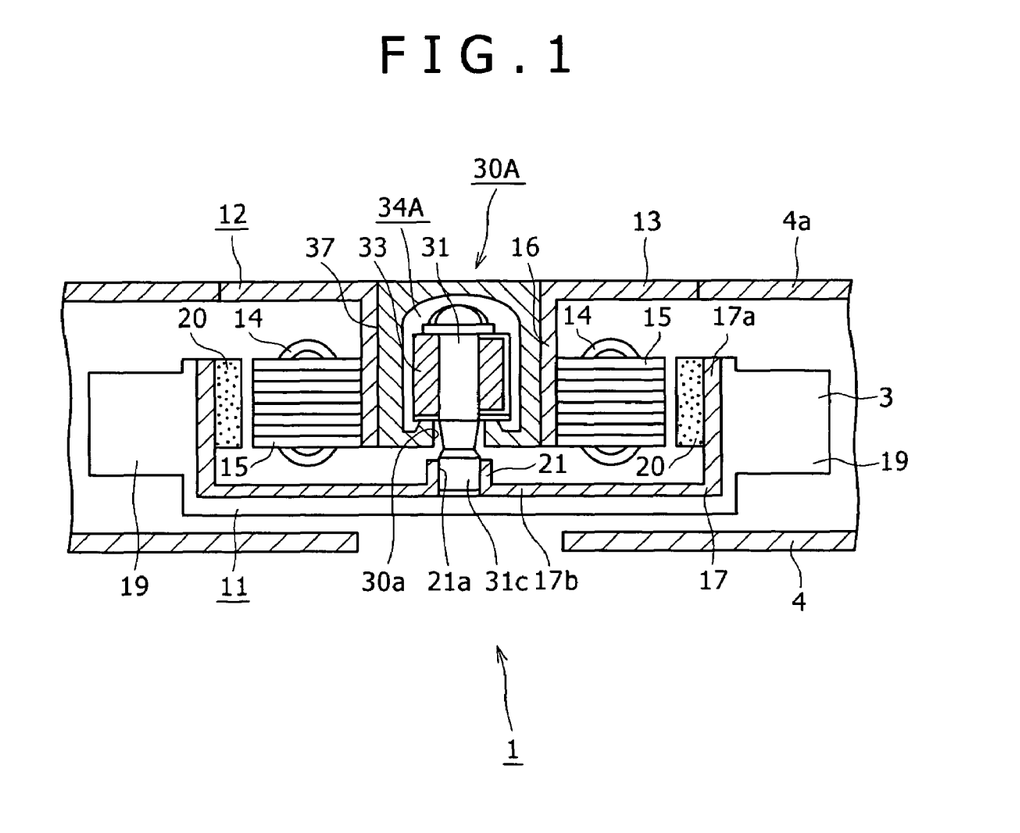
FIG. 1 is a sectional view of a motor to which the present invention is applied.
Figure 2:
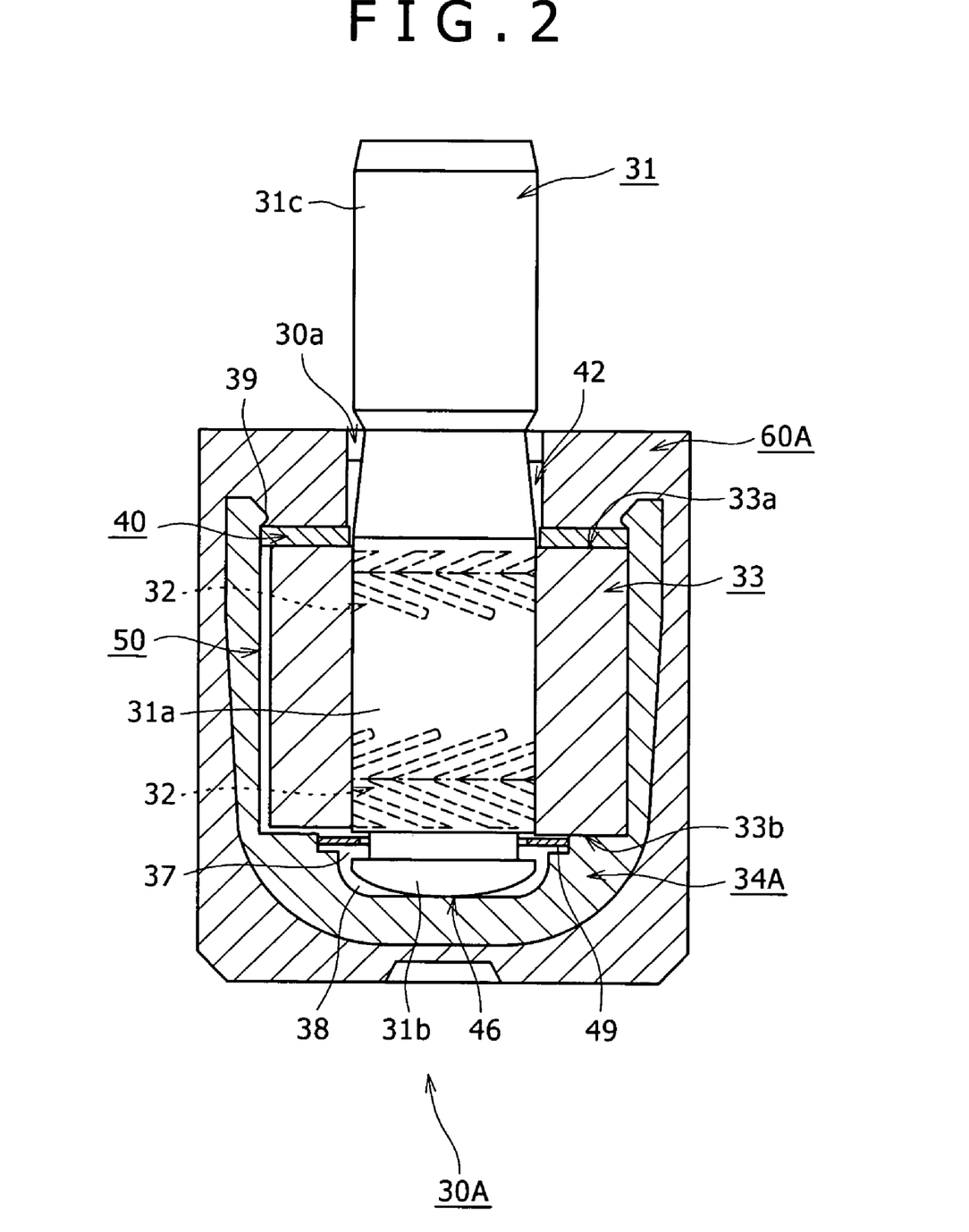
FIG. 2 is a vertical sectional side elevational view of a bearing unit according to a first embodiment of the present invention which is used in the motor of FIG. 1.
Figure 3A:
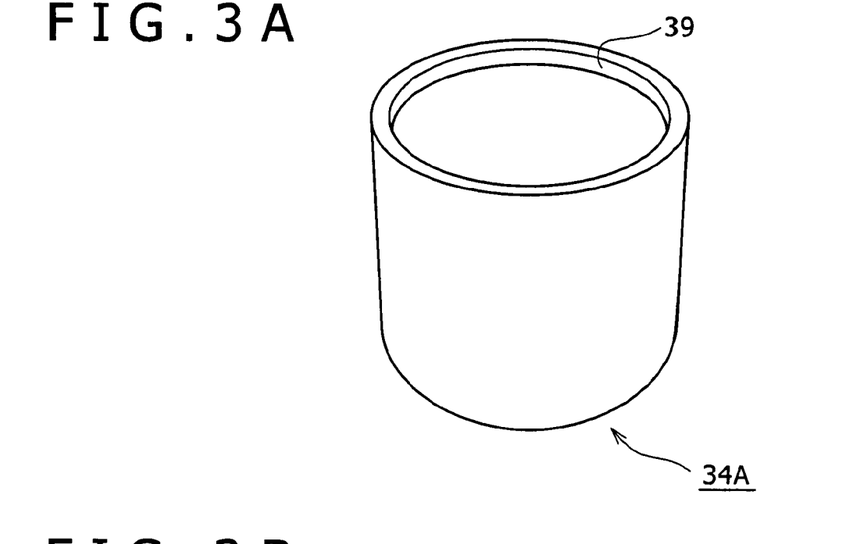
FIG. 3A is a perspective view of the entire path forming member.
Figure 3B:
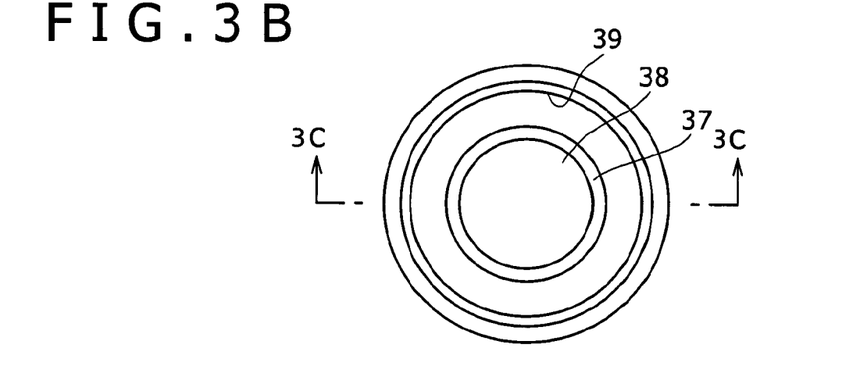
FIG. 3B is a top plan view of the path forming member and FIG. 3C is a vertical sectional side elevational view taken along line 3C-3C of FIG. 3B.
Figure 3C:
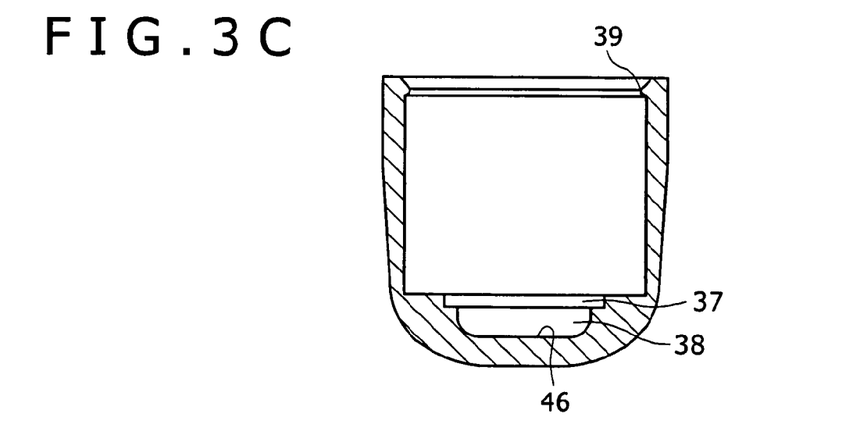

A structure of the path forming member 34A which can be suitably applied to the bearing unit 30A shown in FIGS. 1 and 2 is shown in an enlarged scale in FIGS. 3A to 3C. Referring to FIGS. 3A to 3C, the path forming member 34A shown a generally cup-shaped configuration and has a cylindrical structure capable of fully covering over an outer periphery of the radial bearing 33. In other words, the path forming member 34A does not have, at an upper portion thereof, such cutaway portions 35 as are provided on the path forming member 34 of the arrangement of the related art described hereinabove, and it is formed in such a size that the voids of the grooves of the communicating paths 50 can be assured.

At a central portion of a bottom portion of the path forming member 34A, a space 37 which can accommodate a flexible coming off preventing washer 49, which is flexibly expanded when the shaft 31 is inserted into the coming off preventing washer 49, and another space 38 which can accommodate a lower end portion 31b of the shaft 31 are formed concentrically. The spaces 37 and 38 serve also as a thrust space, which is communicated with the communicating paths 50 and through which the lubricating oil 42 can be circulated. Further, an engaging pawl 39 is formed inwardly along an overall circumferential edge of the top opening of the path forming member 34A.

In the assembly of the bearing unit 30A, the coming off preventing washer 49 is disposed in advance in the space 37 of the path forming member 34A and the radial bearing 33 is fitted into the coming off preventing washer 49 with the thrust bearing side end face 33b side thereof directed downwardly. Then, the path forming member lid 40 is fitted from above into the path forming member 34A until that it is engaged with and secured by the engaging pawl 39 so that it contacts closely with the shaft opening side end face 33a of the radial bearing 33.

As a result of such an assembly, the three third grooves 53 of the radial bearing 33 are closed up with the path forming member lid 40 to form pipe-shaped space paths. Further, the three first grooves 51 of the radial bearing 33 are closed up with the cylindrical portion of the path forming member 34A to form pipe-shaped space paths. Further, the three second grooves 52 of the radial bearing 33 are opened to the space 37. Consequently, lubricating oil 42 can be supplied and circulated to dynamic pressure generating grooves 32 of the shaft 31 through the communicating paths 50 formed from the space paths mentioned.

It is to be noted that, while in the embodiment described above, the communicating paths 50 each formed from a first groove 51, a second groove 52 and a third groove 53 are formed at angular intervals of 120 degrees, the number of the communicating paths 50 is not limited to three and may be, for example, one. However, the radial bearing 33 preferably has a plurality of communicating paths provided symmetrically therearound as in the present embodiment.

In this assembled state, the assembly is sealed over the outer surface of the path forming member 34A and the upper face of the path forming member lid 40, except the shaft fitting hole 40h, with a resin material using a metal mold. By the sealing, the overall outer surface of the path forming member 34A and the upper face of the path forming member lid 40 can be covered with the housing 60A made of a resin material.

Thereafter, the shaft 31 is inserted and forced into the shaft fitting hole 40h (FIG. 8) of the path forming member lid 40, the through-hole 33h (FIG. 9) of the radial bearing 33 and the central portion of the coming off preventing washer 49. As a result, the bearing unit 30A having such a structure as shown in FIG. 2 is obtained.

After the bearing unit 30A is completed, lubricating oil 42 is poured into the axial opening end 30a side of the bearing unit 30A so that it is spread to the space between the shaft fitting hole 40h of the radial bearing 33 and the shaft 31 and into the communicating paths 50. The lubricating oil 42 thus functions to short-circuit pressure that is generated when the shaft 31 and the radial bearing 33 rotate relative to each other.

A coming off preventing washer 49 is provided as a coming off preventing element for the shaft 31 on the bearing unit 30A to enhance the convenience in use. The coming off preventing washer 49 may be made of a resin material, such as nylon or polyamide, or a metal material.

The bearing unit 30A is assembled in such a manner as described above.

The radial bearing 33 does not contact directly with the housing 60A because it is covered fully with the path forming member lid 40 and the path forming member 34A, except the axial opening portion thereof. Therefore, the lubricating oil 42 filled in the void in the inside of the bearing unit 30A does not at all come round to the outer side of the path forming member lid 40 and the path forming member 34A.

Further, since the path forming member 34A has a full circumference structure, the thickness of the housing 60A in the diametrical direction is uniform. Therefore, upon molding of the housing 60A, resin flows uniformly to the overall circumference. Consequently, the appearance of a weld of resin, which appears in the bearing unit 30 of the related art, can be suppressed to the utmost.

Further, since the path forming member 34A has a full circumference structure, it has a higher rigidity than the path forming member 34 of the related art which has a pawl structure, and this is effective also for the prevention of an appearance of a crack.

Accordingly, since no weld or crack appears upon molding of the housing 60A, a stabilized molding condition can be maintained.

From the foregoing, since the configuration of the path forming member 34A has a full circumference structure, a bearing unit, which is superior in reliability, in that it is less likely to suffer from leaking of lubricating oil, can be obtained due to the reinforcement of the sealing structure for lubricating oil and also to stabilization of the resin molding condition.

Figure 4:
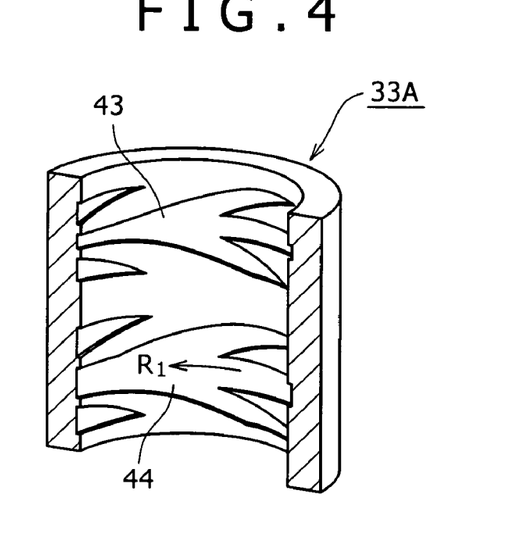
FIG. 4 is a perspective view, partly in section, of the radial bearing of FIG. 3, which has dynamic pressure generating grooves formed on an inner circumferential face thereof.

While in the bearing unit 30A according to the first embodiment dynamic pressure generating grooves are provided on the shaft 31, dynamic pressure generating grooves 43 and 44 may be provided on an inner circumferential face of a radial bearing 33A as seen in FIG. 4.

As a material for the radial bearing 33 or 33A, a metal material, such as sintered metal, brass or stainless steel, or a resin material may be used.

Further, the thrust bearing element may be a dynamic pressure fluid bearing or a pivot type bearing. In FIG. 2, a pivot thrust bearing element is used wherein the shaft 31 has a spherical lower end and the path forming member 34A is made of a resin material.

Further, in the bearing unit of the present embodiment, the communicating paths 50 are provided to short-circuit a dispersing dynamic pressure generated between the two dynamic pressure generating grooves 32 upon rotation of the shaft 31 and a dispersing static pressure generated together with a rise of the dynamic pressure.

If the dynamic pressure and the static pressure are not short-circuited between the dynamic pressure generating grooves 32, then when the dynamic pressure on the non-opening side of the shaft 31 is lower than that on the opening side of the shaft 31, the static pressure becomes relatively higher. Consequently, a force acting to push up the shaft 31 is generated. If the shaft 31 is pushed outwardly by the force, then the bearing unit 30A may not exhibit a function as a bearing unit.

The amount of dynamic pressure generated in the dynamic pressure generating grooves 32 depends upon the depth of the dynamic pressure generating grooves, the void amount between the dynamic pressure generating grooves and the shaft, the mechanical accuracy of the groove angle and so forth. However, it is very difficult to adjust the mechanical accuracy to an equal level. Therefore, it is desirable to provide the communicating paths 50 between the dynamic pressure generating grooves 32 to short-circuit the dynamic pressure and the static pressure.

Further, although the material of the housing 60A is not limited particularly, the housing 60A in the present embodiment is formed by outsert molding of a resin material such as POM (polyoxymethylene), polyimide, LCP (liquid crystal polymer) or the like.

Second Embodiment

Figure 5:
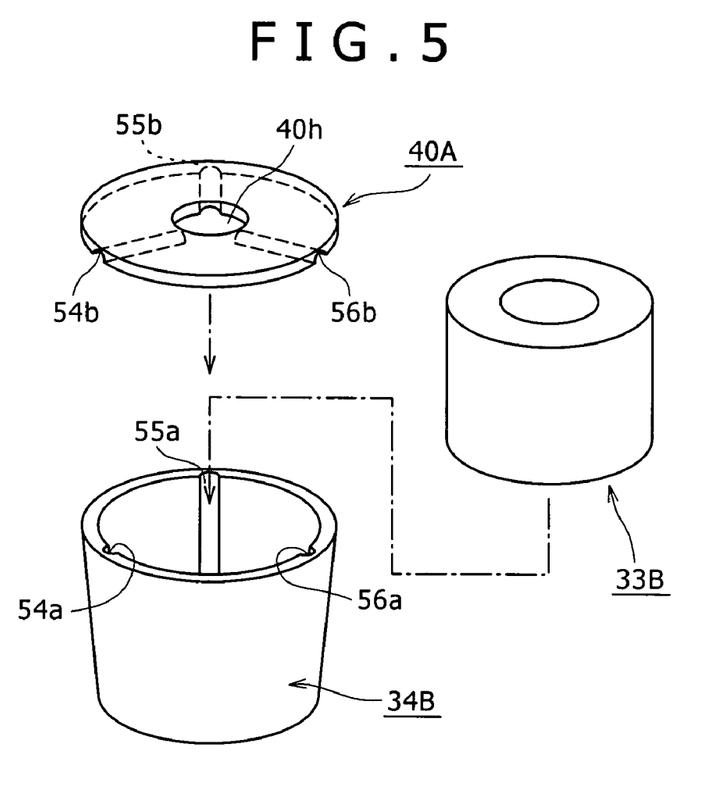
FIG. 5 is an exploded perspective view showing a configuration of communicating paths formed between a path forming member and a radial bearing which are used in a bearing unit according to a second embodiment of the present invention.

Now, another bearing unit to which the present invention is applied is described with reference to FIG. 5. It is to be noted that a sectional view of the bearing unit similar to that of FIG. 2 is omitted for the convenience of illustration.

The communicating paths 50 in the bearing unit 30A of the first embodiment described hereinabove are configured such that the first grooves 51, the second grooves 52 and the third grooves 53 are provided on the radial bearing 33 and are closed up with the path forming member 34A and the path forming member lid 40 to form pipe-like space paths. However, in the bearing unit according to the second embodiment of the present invention shown in FIG. 5, such communicating paths are formed in such a manner as seen in FIG. 5. In particular, referring to FIG. 5, such first grooves 51, 52 and 53 as described hereinabove are not provided on the outer periphery and the opposite upper and lower end faces of the radial bearing 33A. Instead, for example, three grooves 54a, 55a and 56a are formed in an axial direction on an inner circumferential face of a path forming member 34B, and three grooves (not shown) are provided toward the center also on the bottom face of the path forming member 34B in a communicating relationship with the grooves 54a, 55a and 56a. Further, three grooves 54b, 55b and 56b are formed in an equally angularly spaced relationship around a shaft fitting hole 40h on an inner face (lower face or rear face) of a path forming member lid 40A, which closes up an opening at the upper end of the path forming member 34B, in a communicating relationship with the grooves 54a, 55a and 56a, respectively.

Meanwhile, a radial bearing 33B used in the present bearing unit does not have any groove on an outer circumferential face and an upper end face thereof. The radial bearing 33B having such a structure as just described is fitted into the path forming member 34B, and then the path forming member lid 40A is fitted into the radial bearing 33B from above. Consequently, the outer circumferential face of the radial bearing 33B closes up the three grooves 54a, 55a and 56a formed on the inner circumferential face of the path forming member 34B to form three space paths. Further, the flat upper end face of the radial bearing 33B closes up the three grooves 54b, 55b and 56b formed on the path forming member lid 40A to form three space paths. The space paths are communicated with each other to form communicating paths 50 similar to those in the bearing unit 30A of the first embodiment described hereinabove.

Accordingly, also in the bearing unit of the second embodiment having such a structure as described above, lubricating oil 42 encapsulated in the bearing unit can be circulated through the communicating paths 50.

It is to be noted that, while in the embodiments described above a motor is applied as a rotating apparatus, the bearing unit to which the present invention is applied is not limited to a bearing unit for use with a bearing for a rotary shaft of a motor. In particular, the bearing unit to which the present invention is applied can be applied also to bearings for guide rollers, idlers, capstans, pinch rollers and so forth which are used in apparatuses which involve the takeup of a linear article, such as a yarn or a wire, or a belt-like article, such as a wide film or a magnetic tape.

While preferred embodiments of the present invention have been described using specific terms, such description is for illustrative purposes, and it is to be understood that changes and variations may be made without departing from the spirit or scope of the following claims.

What is claimed is:

1. A bearing unit, comprising:
   a radial bearing and a thrust bearing extending along an axis of rotation and configured to support a shaft for rotation;
   a path forming member and a path forming member lid configured to form a communicating path having a function of short-circuiting pressure generated when said shaft and said radial bearing rotate relative to each other, the path forming member having a cup-shaped configuration defining a recess extending partially thereinto along the axis of rotation and sized to completely receive the radial bearing and the thrust bearing therein and to completely receive the path forming member lid, the path forming member lid operative in conjunction with the path forming member to retain the radial bearing and the thrust bearing in the path forming member, the path forming member completely surrounding the radial bearing, the thrust bearing and the path forming member lid along and about the axis of rotation;
   a housing enveloping the path forming member and the path forming member lid while said housing is open at one end of said shaft with a small void left therebetween; and
   lubricating oil filled in said void;
   wherein said path forming member and said path forming member lid cooperate with each other to fully cover said radial bearing except a shaft opening side portion of said radial bearing, and said housing being made of a molded resin material.

2. The bearing unit according to claim 1, wherein said radial bearing is made of a sintered metal material.

3. The bearing unit according to claim 1, wherein said radial bearing is formed from a dynamic pressure fluid bearing having a dynamic pressure generating groove formed on an inner circumferential face of a through-hole formed therein.

4. The bearing unit according to claim 1, further comprising
   a shaft coming off preventing element provided in a bottom space of said path forming member.

5. A bearing unit, comprising:
   a radial bearing extending along and about an axis of rotation and having a through-hole extending along the axis of rotation, formed at a central portion thereof and configured to support a shaft fitted therein for rotation in a circumferential direction, said radial bearing further having a shaft opening side end face and a thrust bearing side end face;
   a path forming member having a cup-shaped configuration defining a recess extending partially thereinto along the axis of rotation and having a thrust bearing formed at a bottom portion thereof and covering an overall outer circumferential face of said radial bearing along the axis of rotation;
   a path forming member lid having a shaft fitting hole formed at a central portion thereof and having a diameter sufficient to allow said shaft to be fitted in said shaft fitting hole, said path forming member lid covering the shaft opening side end face of said radial bearing, the path forming member lid sized to be received in the recess and operative in conjunction with the path forming member to retain the radial bearing and the thrust bearing in the path forming member, the path forming member completely surrounding the radial bearing, the thrust bearing and the path forming member lid along and about the axis of rotation; and
   a housing enveloping the path forming member and the path forming member lid,
   said bearing unit having an integral structure wherein said radial bearing is fitted coaxially in said path forming member with the overall outer circumferential face thereof covered with said path forming member and is closed up with said path forming member lid with the shaft opening side end face thereof covered with said path forming member lid such that a plurality of lubricating oil circulating paths are formed such that a space between the shaft opening side end face of said radial bearing and an inner face of said path forming member lid, another space between the outer circumferential face of said radial bearing and the inner circumferential face of said path forming member, and a further space in the proximity of said thrust bearing and said through-hole of said radial bearing are communicated with each other while lubricating oil is enclosed in said lubricating oil circulating paths and the overall bottom face and the overall outer circumferential face of said path forming member and the upper face of said path forming member lid, except a portion in the proximity of said shaft fitting hole, are covered with said housing.

6. The bearing unit according to claim 5, wherein said radial bearing is made of a sintered metal material.

7. The bearing unit according to claim 5, wherein said radial bearing is formed from a dynamic pressure fluid bearing having a dynamic pressure generating groove formed on an inner circumferential face of a through-hole formed therein.

8. The bearing unit according to claim 5, further comprising
   a shaft coming off preventing element provided in a bottom space of said path forming member.

9. The bearing unit according to claim 5, wherein said housing is formed as a unitary member from a molded article of a synthetic resin material.

10. A rotating apparatus, comprising:
    a radial bearing extending along and about an axis of rotation and having a through-hole formed at a central portion thereof along the axis of rotation and configured to support a shaft fitted therein for rotation in a circumferential direction, said radial bearing further having a shaft opening side end face and a thrust bearing side end face;
    a path forming member having a cup-shaped configuration defining a recess extending partially thereinto along the axis of rotation and having a thrust bearing formed at a bottom portion thereof and covering an overall outer circumferential face of said radial bearing;

a path forming member lid having a shaft fitting hole formed at a central portion thereof and having a diameter sufficient to allow said shaft to be fitted in said shaft fitting hole, said path forming member lid covering the shaft opening side end face of said radial bearing, the path forming member lid sized to be received in the recess and operative in conjunction with the path forming member to retain the radial bearing and the thrust bearing in the path forming member, the path forming member completely surrounding the radial bearing, the thrust bearing and the path forming member lid along and about the axis of rotation; and a housing enveloping the path forming member and the path forming member lid, said bearing unit having an integral structure wherein said radial bearing is fitted coaxially in said path forming member with the overall outer circumferential face thereof covered with said path forming member and is closed up with said path forming member lid with the shaft opening side end face thereof covered with said path forming member lid such that a plurality of lubricating oil circulating paths are formed such that a space between the shaft opening side end face of said radial bearing and an inner face of said path forming member lid, another space between the outer circumferential face of said radial bearing and the inner circumferential face of said path forming member, and a further space in the proximity of said thrust bearing and said through-hole of said radial bearing are communicated with each other while lubricating oil is enclosed in said lubricating oil circulating paths and the overall bottom face and the overall outer circumferential face of said path forming member and the upper face of said path forming member lid, except a portion in the proximity of said shaft fitting hole, are covered with said housing;

said shaft being fitted in and supported for rotation by said through-hole of said radial bearing such that the thrust end side portion of said shaft contacts with said thrust bearing of said path forming member.

11. The rotating apparatus according to claim 10, wherein said rotating apparatus is a motor including a stator and a rotor, and a rotary shaft of said rotor is supported for rotation relative to said stator by said bearing unit.

12. The rotating apparatus according to claim 10, wherein said bearing unit includes a shaft coming off preventing member provided in a bottom space of said path forming member, and said thrust end portion of said shaft is locked in a center hole of said shaft coming off preventing member.

* * * * *